United States Patent [19]

Fischer et al.

[11] 4,428,679

[45] Jan. 31, 1984

[54] PROCESS FOR MIXING AND COOLING ELECTRODE MATERIAL

[75] Inventors: Werner K. Fischer, Venthone, Switzerland; Felix Keller, Brielle, Netherlands; Max Hänni, Schaffhausen, Switzerland

[73] Assignee: Swiss Aluminium Ltd., Chippis, Switzerland

[21] Appl. No.: 135,870

[22] Filed: Mar. 31, 1980

[30] Foreign Application Priority Data

Apr. 5, 1979 [CH] Switzerland .................. 3194/79

[51] Int. Cl.³ .................. B01F 15/02; B01F 15/04; B01F 15/06
[52] U.S. Cl. .................. 366/141; 204/67; 204/294; 366/147; 366/148; 366/154; 366/167; 366/177; 366/348
[58] Field of Search .................. 366/2–8, 366/105, 10–12, 16, 17, 192, 19, 20, 221, 33, 35, 37, 53, 56, 76, 75, 92–95, 91, 131, 132, 133–135, 154, 141, 144–149, 151, 152, 160, 161, 167, 177, 180, 182, 224, 348, 349; 252/510, 425.3; 204/294, 67; 425/207–209; 419/32, 65

[56] References Cited

U.S. PATENT DOCUMENTS

| | | | |
|---|---|---|---|
| 3,838,976 | 10/1974 | Bosch | 366/144 X |
| 4,075,067 | 2/1978 | Bhilotra | 204/67 |
| 4,124,307 | 11/1978 | Anisic | 366/147 X |
| 4,272,466 | 6/1981 | Harris | 366/142 X |

FOREIGN PATENT DOCUMENTS

1941831 11/1972 Fed. Rep. of Germany .
466230 1/1969 Switzerland .

*Primary Examiner*—Timothy F. Simone
*Attorney, Agent, or Firm*—Bachman and LaPointe

[57] ABSTRACT

A mixture which is used for the manufacture of electrodes and comprises dry material and electrode binding agent. The mixture is prepared in a system which is at least in part dust and gastight and such that the mixture is simultaneously stirred up or fluidized, degassed and homogenized, and treated thermally. In the course of such treatment further additions can be made to the mixture. The described procedure takes place mainly in mixers operating continuously or discontinuously, various arrangements and designs of mixer being possible.

Fundamental to the thermal treatment is that the mixture can be cooled in a mixer such that the coolant vaporizes completely during the mixing.

The thermal treatment is regulated by way of given operational parameters.

16 Claims, 4 Drawing Figures

PROCESS FOR MIXING AND COOLING ELECTRODE MATERIAL

BACKGROUND OF THE INVENTION

The invention relates to a process for preparing a mixture used for the production of electrodes, for the production of aluminum in particular, comprising dry material and an electrode binding agent, the said preparation involving mixing, degassing and a temperature change.

Basically there are two well known processes for preparing the mixture required for the production of electrodes:

1. Pre-crushed residual pieces from used electrodes are sieved and stored as coarse grain material in batteries of silos. Petrol coke is combined with the fines from that crushed material to give a medium sized particulate material. The oversized material from this stage is ground and recirculated, the undersized material and the outsize material from the medium size fraction is ground to dust in a ball mill. Coarse grained residual material, the combined coke-medium size and dusts are led to batch type scales and combined in chosen amounts with green rest material. In double arm kneaders the dry constituent and the green rest are heated and mixed with solid or liquid pitch. This mass is transported to a shaping device.

2. A further process is such that petrol coke and pre-crushed rest from used electrodes are taken from silos, mixed, dried, crushed and divided with sieving devices into coarse, medium and fine fractions. Coarse and fine grinding mills grind the outsize material from the coarse and medium fraction silos. Subsized and possibly also the outsized material from the medium and fine material silos are ground to dust in a ball mill. After the sizing silos the dry component is fed, via continuous weighing facilities, to a pre-heating facility and continuous kneading facility where the green rest and solid or liquid pitch are added, and the mixture then transported to an electrode shaping or forming facility.

With respect to the components of the mixture, the existing systems can be divided into those which operate:

discontinuously (e.g. batch mixing units of the double arm kneader type), or continuously (e.g. extruder or cokneader).

The known processes feature considerable disadvantages, in particular with respect to (a) the mixing process,
(b) the cooling of the mixture,
(c) work-place hygiene and environmental problems.

The disadvantages concerning the mixing process depend on the device used for this.

For example in the case of double arm kneaders it is difficult to overcome wear problems because of design features, which lead to large maintenance costs. The normal bottom emptying of modern double arm kneaders tends to cause sticking and therefore less efficient use of the unit as well as problems with work-place hygiene. The emission of carbon dust, steam and pitch fumes which occurs with double arm kneaders is also difficult to overcome.

Extruders or coextruders involve high investment costs. Due to the strong mixing effect pronounced wear occurs on the shaft and housing. Overcoming this incurs high maintenance costs. Also the throughput can be altered only very slightly.

If it is found necessary to employ a further kneader for higher production, due to the continuous working nature of this unit it is also necessary to install a whole series of other facilities such as storage silos, weighing facilities and pre-heating units.

Furthermore, the effects of the various apparent densities and particulate strength of the various cokes on the density and strength properties of the anodes is very marked under constant mixing conditions.

The cooling of the mixture presents great difficulties in all methods of electrode manufacture. Here it is the wetting properties of the raw materials which determine the mixing temperature, which lies between 150° and 170° C.

The maximum temperature for forming the electrodes on the other hand is limited by deformation and cracking of the electrode. The lower temperature for this is limited by insufficient density, strength and resistance, so that for extruded electrodes the production temperature lies between 90° and 120° C., in the case of vibration-settled electrodes between 130° and 150° C.

In order to keep the mixing and forming temperature within a narrow range, the green mass must be cooled in a specific manner. Using the methods employed up to now, however, there are a number of disadvantages associated with this cooling viz., (a) The emission of pitch fumes leads to pollution of the working area and the surrounding environment.

(b) The flow properties and the thermal conductivity of the electrode mass lead to the formation of lumps and therefore inhomogeneities in the final electrode, strength problems and cracking.

(c) Temperature control is difficult because of measurement and control problems.

(d) Control mechanisms and operating parameters are not clearly defined.

The disadvantages involving work-place hygiene and environmental problems are closely related to the methods used up to now for cooling the mass. For example, when cooling 15 tons of mixture per hour from 150° C. to 110° C. by the most widely used method of direct cooling with air, about 30,000 $m^3$ of air are heated by 20° C. and about 4 kg of condensed tar fumes are given off per hour. The air used for cooling is then enriched with tar fumes and has to be purified, which is possible only at great expense. The present high standards required by environmental regulations mean that this is a disadvantage which is very favorable for existing units.

The object of the present invention is therefore to develop a process for preparing a mixture of dry material and binding agents for the production of electrodes, in particular electrodes for the production of aluminum by mixing, degassing and changing the temperature such that these disadvantages are overcome and also such that the said process is economically favourable for the production of electrodes.

SUMMARY OF THE INVENTION

This object is solved by way of the invention in that the dry material and/or the mixture made of dry material and binding agent is simultaneously suspended, stirred or fluidized, degassed and homogenized and treated thermally in a system which is at least partially dust and gas-tight.

During this process it is possible to make additions, if desired in the smallest quantities, to the dry material and/or the mixture and to distribute these uniformly in the mixture. The invention embraces therefore both the addition of binding agent and coolant as well as the addition of materials to improve the mechanical properties and/or a better burn-off behavior of the electrode i.e. an improvement in the consumption of the electrode not concerned with the actual electrolysis step of the reduction process.

For this reason, the intensive, turbulent stirring, suspension or fluidizing may usefully be carried so far that the individual particles move around freely in the mixing space independent of each other. As a result this makes it possible to achieve optimal wetting with additives fed into the mixing space.

To achieve such intensive, turbulent mixing, use is made preferably of a mixer with a rotating mixing basin in which there is at least one impeller system which rotates with an eccentric drive around the axis of rotation of the basin at a higher rate than that of the basin itself.

Such a device is known e.g. from the Swiss Pat. No. 466 230 or the German Pat. No. 19 41 831 and is generally known as a forced counter-flow mixer or intensive mixer.

The thought underlying the invention embraces, however, also other mixing systems with and without rotating containers, but of adequate mixing ability. Likewise, this includes devices by means of which dry material or the mixture is brought into a state similar to that of a fluidized bed i.e. such that the solid material is stirred up to such a degree that it resembles in many respects a homogeneous fluid.

In the mixer the mixture is stirred up by at least one impeller system, continuously homogenized and degassed. This produces a further basic advantage of the invention in that the density, the electrical conductivity and the mechanical strength of the electrode are significantly raised by this continuous homogenizing and degassing. The capacity of the baking furnace and the service life of the electrode in the cell increase along with the increase in density.

A further basic advantage of the invention is that a thermal treatment takes place along with the stirring, homogenizing and degassing. Depending on the make up of the electrode manufacturing plant it can then be necessary that in the mixer e.g.

(a) there is only continuous cooling, or
(b) there is only continuous heating, or
(c) there is discontinuous heating followed by cooling in one mixer, or
(d) there is continuous heating in one mixer and cooling in a second mixer.

Coolants which can be considered are in particular those which vaporize readily, preferably water, which vaporizes completely on mixing. It has been found advantageous to determine by proper testing, the place in the mixing bed where the input of coolant is most favorable and from which inlet position the coolant best and most effectively reaches the particles tumbling around in the mixer. Usefully a regenerative cooler is provided on the mixer, in which the coolant can be condensed, collected, purified and, if desired, fed into the mixture again.

One basic advantage of the invention is that, as a result of using the mixer for stirring up, homogenizing and degassing or thermally treating the charge, the whole electrode manufacturing process can be carried out in a closed system. This represents a very fundamental step with respect to improving work-place hygiene and protecting the environment.

A further basic advantage of the invention lies in the ability to control the effect of heating by means of operational parameters.

The coolant should cool the mixture. It should however also be removed as completely as possible when the mixture comes into the electrode shaping unit as, otherwise, there is a great danger of cracks and other defects in the electrode. The amount of coolant fed into the system is controlled via the electrode temperature in the shaping unit, there being a given limiting temperature which must not be exceeded. The density which can be achieved in the electrode depends, among other things, on the temperature during shaping. The electrodes, however, have to be the same height for use in the cell; the height of each electrode is therefore measured by another circuit and kept constant automatically by the change in electrode weight.

If the weight of the electrode exceeds a certain lower or upper limit, parameters governing the production of the mixture (composition, throughput, degree of mixing) are altered correspondingly.

The main, operating parameters are:
optimum rate of throughput, taking into account the properties of the raw material,
the optimum input and output temperatures and the measuring system for this,
optimum position for input of water and the feeding conditions,
optimum throughput conditions and the related feedback system between control of the outlet system and the level of the charge,
assessment of the mixture making up the green mass, with respect to optimum properties in the baked electrode,
cooling effect of the coolant per unit,
definition of the requirements made of the electrode mass for the different shaping processes,
and other parameters.

There is a broad range of applications for the process according to the invention.

In the case of existing units for the production of electrodes the process is used principally for continuously cooling the mixture. If, for example, the unit comprises a series of storage silos for different particle sizes of coke, dosage devices, pre-heating facilities, an upper and lower kneader and cooling stretch, all in line, then the upper mixer and the lower mixer can be replaced by one mixer. The dry material is fed from the storage silos via dosage devices into the pre-heating facilities and from there heated to about 120° C. in an upper kneader in which the electrode binding agent is added. Instead of a second co-kneader of the so-called upper kneader and a subsequent cooling stretch, a cooling mixer is, according to the invention, provided after the upper kneader, whereby however the invention also offers the possibility of keeping the lower kneader and replacing only the cooling stretch with the cooling mixer.

The dry material mixed with the binding agent leaves the upper kneader and enters the mixer where it is intensively stirred up or fluidizing. At this stage the lumps formed during kneading are broken up and any non-uniform wetting by the binding agent is to a large degree eliminated. The fluidizing also causes the gases which are formed mainly by the heating to be released. At the same time, if desired, additions which improve the mixture further are introduced here. Coolant is fed to the fluidizing mixture via an inlet pipe and in quantities such that it vaporizes again completely due to the mixing.

The cooled mixture is fed via a conveyor system to a shaping unit. The whole procedure takes place continuously in a dust and gas-tight system.

A further possibility for employing the process according to the invention is such that also the upper kneader is replaced by a continuous mixer. The dry material is fed from the storage silos via dosage devices into a pre-heating facility and from there into the continuous mixers. Liquid binding agent is fed in specific amounts from a storage tank into these mixers. This continuous mixer has the advantage over a kneader in that already at this stage the binding agent is so homogeneously distributed that it uniformly wets the dry component. The mixture of dry material and binding agent is then fed to the cooling mixer where the addition of coolant and additives takes place. The mixer is then transferred from the cooling mixer again via a conveyor facility to the shaping unit.

This process also takes place continuously and in a dust and gas-tight system.

The use of the mixer in a discontinuous process requires a different plant. The dry material is led from storage silos via a conveyor system to batch type scales and then to a mixer working discontinuously. In a first step this mixer is heated and the electrode binding agent added to the dry material in specific amounts via the batch type scales.

During the heating-up stage the dry component of the mixture is intensively stirred up, degassed and homogenized. After the addition of the binding agent various additives, if desired, are added to the mixer. The mixer must then be switched over to cooling, which takes place by the introduction of a coolant via an inlet pipe. After the necessary amount of cooling, the mixture is passed on a conveyor system to the shaping unit.

What this kind of plant it has been found advantageous to operate with several mixers in the unit, such that at any time one is being heated while the others cool.

A modification of the process employing continuous operation of several mixers is such that the dry material from the storage silos is fed to a battery of mixers. The binding agent is added to the dry material in this battery made up of a plurality of mixers. The resultant mixture is then fed on a conveyor system to a continuously operating dosage or proportioning device and from there to a continuously operating cooling mixer. Additives and coolant are fed in and the cooled mixture passed on to the shaping unit.

BRIEF DESCRIPTION OF THE DRAWINGS

Further advantages and details of the invention are revealed in the following description of preferred exemplified embodiments and in the drawings viz.

DETAILED DESCRIPTION

Figure 1:
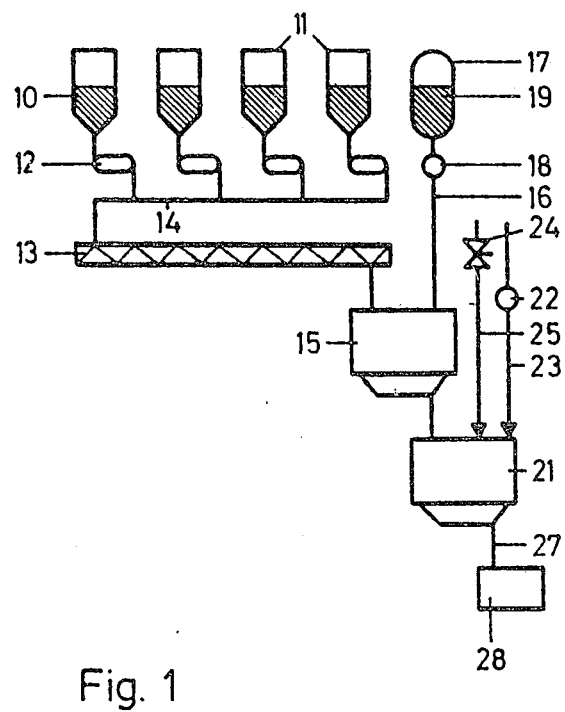
FIG. 1: A schematic representation of a process for the production of electrodes.

As shown in FIG. 1, dry material 10, preferably a mixture of coke, electrode residue and green rest, is separated according to particle size and stored in silos 11. The dry material 10 is passed, via continuously operating dosage facilities 12 to a conveyor system 14 on which the individual particle sizes are put together in certain ratios, and then into a pre-heating facility 13. After that, the material 10 is brought to the required temperature in a throughflow mixer 15 which operates continuously. The pre-heated dry material 10 is stirred up intensively in this mixer 15 and liquid electrode binding agent 19 added to it from a storage container 17 via a feed pipe 16 and a continuously operating dosage facility 18. The mixture thus produced is then passed on to a continuously operating cooling mixer 21 where it is again stirred up intensively, homogenized and degassed. The controlled addition of additives, if desired, takes place in this mixer 21 via feed pipe 23 and dosage device 22. Coolant enters the mixer 21 via a control valve 24 and coolant feed pipe 25. The mixture of dry material 10, electrode binding agent 19 and additives, cooled to a predetermined temperature, is transported to a shaping unit 28 by a conveyor facility 27.

Figure 2:
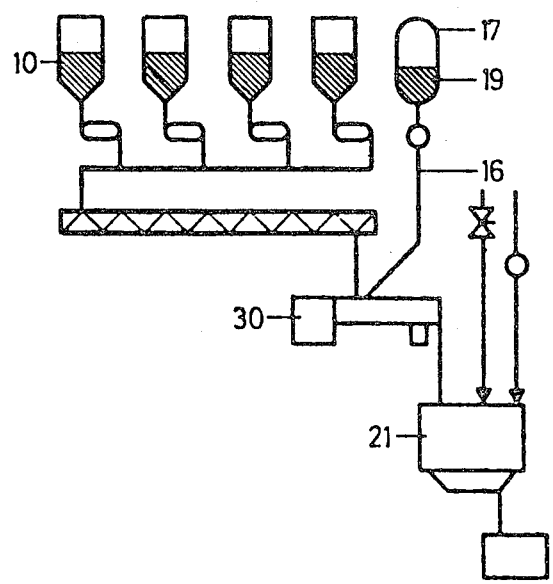
FIG. 2: A further version of the process according to FIG. 1.

The process for manufacturing electrodes shown schematically in FIG. 2 corresponds to that in FIG. 1, with the exception that the continuous mixer 15 is replaced by a kneading device 30, in which the solid or liquid electrode binding agent 19 from the storage tank 17 is added to the dry material 10 via the feed pipe 16.

Figure 3:
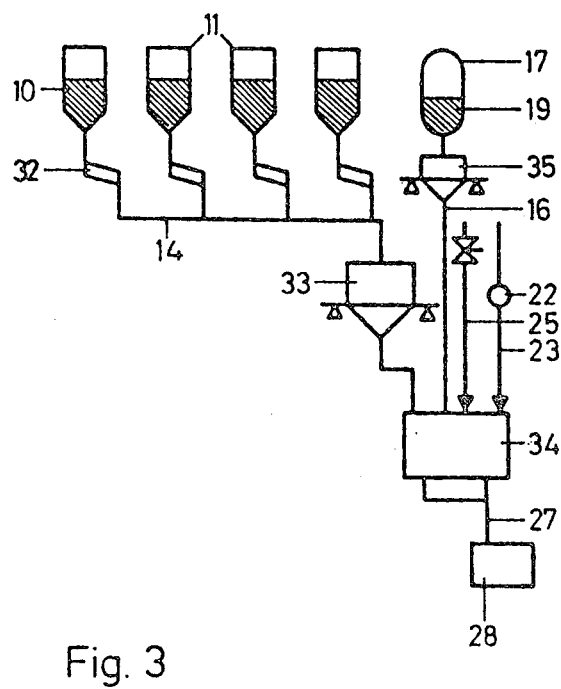
FIG. 3: A further version of the process according to FIG. 1.

In FIG. 3 the dry material 10 is passed from the storage silos 11 via the feeders 32 and the conveyor 14 to a batch weighing device 33 and from there to a discontinuous mixer 34 in which the dry material 10 is stirred up and pre-heated. Electrode binding agent 19 is passed from the storage silo 17 via a further batch weighing device 35 and feed pipe 16 and then added to this pre-heated dry material. After this, if desired, the controlled addition of additives is made via feed pipe 23 and dosage facility 22 and coolant is introduced via supply line 25. The cooled mixture is then transported on the conveyor 27 to the shaping unit 28.

Figure 4:
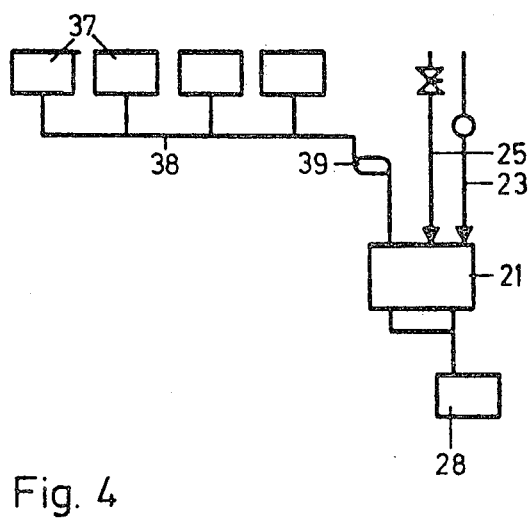
FIG. 4: A further version of the process according to FIG. 1.

As shown in FIG. 4, the dry material is passed from storage silos via a batch weighing unit—none of which is shown here—to a series of mixers—here a series of four mixers 37 is shown. There, the dry material is heated and—not shown—electrode binding agent added to it. The resultant mixture is thus collected on a conveyor 38 and then fed to the continuously operating cooling mixer 21 via a continuous dosage device 39. After that the addition of additives described in FIG. 1 takes place via a feed pipe 23, the addition of coolant via the coolant supply line 25 and the cooled mixture then passed on to the shaping unit 28.

EXAMPLES

1st set of conditions

A unit for manufacturing anodes comprises silos for storing different particle sizes of raw material, dosage or proportioning devices for dry material, preheating facilities (pre-heating screw), an upper and lower kneader, a cooling stretch (air cooling) and a shaping device, all arranged in series.

The operating parameters were as follows:

| | |
|---|---|
| Rate of throughput of mixture through the unit | 14 t/h |
| Temperature at exit of lower kneader | 152° ± 3° C. |
| Temperature of the pressed anode | 104° ± 6° C. |
| Amount of air as coolant | 28000 m³/h ± 2000 m³h |
| Weight of green anode (before baking) | 456 kg ± 6 kg |
| Length of anode (controlled) | 512 mm ± 2mm |

The anode produced under these conditions had the following properties after baking:

| | |
|---|---|
| density | 1,539 kg/dm³ |
| specific electrical resistance | 60,4 μ Ω m |
| fracture strength | 5 daN/cm² |

2nd set of conditions

Here, the cooling stretch with air cooling was replaced by a counter-flow intensive-mixer in which the hot mass was mixed with water.

The operating parameters were as follows:

| | |
|---|---|
| Throughput | 14 t/h |
| Temperature at exit of lower kneader | 152° ± 3° C. |
| Temperature of the pressed anode | 115° ± 2° C. |
| Amount of coolant water | 103 l/h |
| Weight of green anode | 467 kg ± 2 kg |
| Anode length (controlled) | 512 mm ± 2 mm |

The anode produced under these conditions had the following properties when baked:

| | |
|---|---|
| density | 1,561 kg/dm³ |
| specific electrical resistance | 57,6 μ Ω m |
| fracture strength | 98 daN/cm² |

The use of the intensive mixer with water cooling gave the following advantages:

The temperature at which the anode is pressed can be raised by 11° C. without cracks forming.

The weight of the anode is 11 kg (2.4%) greater, as a result of which the capacity of the baking furnace is increased without additional cost.

The higher density in the anode improves the service life of the anode in the cell.

The other physical porperties are also improved.

There is no emission of air contaminated with tar vapor.

Under constant production conditions the amount of cooling water used is varied. This results in an approximately linear dependence of the anode temperature on the amount of water added.

Results

By employing an intensive mixer to cool the mass used to manufacture anodes the anode temperature can be set at will between 105° C. and 125° C. by varying the amount of cooling water, and this without resultinng in variations in anode weight or cracks in the anode surface.

With air cooling, on the other hand, at temperatures over 108° C. cracks appear, and falling temperatures (at constant anode length) result in decreasing anode weight.

3rd set of conditions

Both the lower kneader and the cooling stretch were replaced by a cooling mixer.

Results

Under the same operating conditions the advantages obtained with the 2nd set of conditions were fully realized again. This means that by replacing the lower kneader considerable investment and running costs can be saved without penalty in quality or throughput.

What is claimed is:

1. Process for preparing a material selected from the group consisting of (1) a dry material, and (2) a mixture of dry material and electrode binding agent which is used for the production of electrodes, in particular in the manufacture of electrodes for production of aluminum characterized by mixing, degassing and change of temperature, including the steps which comprises: providing a material selected from the group consisting of (1) said dry material, and (2) said dry material and electrode binding agent; treating said material by turbulent stirring or fluidizing, degassing and homogenizing, and simultaneously thermally treating in a system which is, at least in part, dust and gas-tight, and thereby obtaining a homogenized and degassed mixture.

2. Process according to claim 1 wherein additives are made in small amounts to said material during said treating, and are homogeneously distributed.

3. Process according to claim 1 wherein turbulent stirring, homogenizing, degassing and thermal treatment takes place in at least one mixer.

4. Process according to claim 3 wherein said material is intensively stirred, homogenized and degassed in said mixer such that the charged material is simultaneously subjected to a thermal treatment.

5. Process according to claim 3 wherein during the turbulent stirring, homogenizing and degassing a coolant is fed into said mixer via a coolant feed pipe.

6. Process according to claim 5 wherein the coolant employed is a liquid coolant which vaporizes completely during the mixing.

7. Process according to claim 5 wherein the coolant condenses in a regenerative cooler, is collected, purified and fed back again to the mixture.

8. Process according to claim 3 wherein the mixer is heated during the stirring, homogenizing and degassing.

9. Process according to claim 3 wherein during the stirring, homogenizing and degassing, said material is heated in a first step and then cooled in a second step.

10. Process according to claim 5 wherein thermal treatment is controlled by process parameters comprising throughput, temperature before cooling, temperature of the electrode, electrode weight and length and the amount of coolant.

11. Process according to claim 10 wherein the temperature of the electrode is changed in an approximately linear manner within given temperature limits via the amount of coolant added and under constant conditions of throughout, temperature before cooling and electrode length.

12. Process according to claim 10 wherein the length of the electrode is kept constant by means of a control circuit measuring changes in electrode weight.

13. Process according to claim 1 wherein said material is fed, in a continuous operation inside a dust and gas-tight system, from silos via a pre-heating device to a first continuous mixer in which electrode binding agent is added to the dry material, and from there to a second cooling mixer in which the mixture is cooled and desired additions are made, and such that in both the first and second mixers said material is intensively stirred up, homogenized and degassed, and then led to a shaping unit via a conveyor device.

14. Process according to claim 1 wherein said material is fed, in a continuous operation inside a dust and gas-tight system, from silos via a pre-heating device to one or more kneading devices in which electrode binding agent is added to the dry material, and from there to a cooling mixer in which the mixture is cooled and desired additions are made, and such that in the mixer said material is intensively stirred up, homogenized and degassed, and then led to a shaping unit via a conveyor device.

15. Process according to claim 1 wherein said dry material is led, inside a dust and gas-tight system, from silos via a batch weighing device to a discontinuously operating mixer in which it is intensively stirred up, homogenized, degassed and in a first step is heated and treated with electrode binding agent and in a second step receives desired additions and is treated with coolant, and finally is led off to a shaping facility.

16. Process according to claim 1 wherein dry said material is led inside a dust and gas-tight system, from silos to a battery of mixers where it is heated, treated with electrode binding agent and mixed, and the resultant mixture then fed via a dosage device to a continuously operating cooling mixer in which it is stirred up, homogenized, degassed and treated with additives and coolant and then led off to a shaping facility.

* * * * *

UNITED STATES PATENT AND TRADEMARK OFFICE
CERTIFICATE OF CORRECTION

PATENT NO. : 4,428,679

DATED : January 31, 1984

INVENTOR(S) : Werner K. Fischer, Felix Keller and Max Hänni

It is certified that error appears in the above-identified patent and that said Letters Patent are hereby corrected as shown below:

In Column 2, line 50, change "favorable" to ---unfavorable---.

In Column 3, line 56, change "proper" to ---prior---.

In Column 4, line 62, change "fluidizing" to ---fluidized---.

In Column 5, line 1, change "fluidizing" to ---fluidized---.

In Column 10, line 1, claim 15, after "said" delete "dry".

In Column 10, line 9, claim 16, after "wherein" delete "dry".

Signed and Sealed this

Twenty-fourth Day of April 1984

[SEAL]

Attest:

GERALD J. MOSSINGHOFF

Attesting Officer  Commissioner of Patents and Trademarks